Dec. 18, 1956 G. H. TOWNER 2,774,957

ANALOGUE TO DIGITAL FUNCTION CONVERTER

Filed March 5, 1954 5 Sheets-Sheet 1

INVENTOR:
George H. Towner

By Herbert E. Metcalf
His Patent Attorney

Dec. 18, 1956 G. H. TOWNER 2,774,957

ANALOGUE TO DIGITAL FUNCTION CONVERTER

Filed March 5, 1954 5 Sheets-Sheet 2

INVENTOR:
George H. Towner
By Herbert E. Metcalf
His Patent Attorney

Dec. 18, 1956 G. H. TOWNER 2,774,957

ANALOGUE TO DIGITAL FUNCTION CONVERTER

Filed March 5, 1954 5 Sheets-Sheet 3

INVENTOR:
George H. Towner

By Herbert E. Metcalf
His Patent Attorney

Dec. 18, 1956 G. H. TOWNER 2,774,957

ANALOGUE TO DIGITAL FUNCTION CONVERTER

Filed March 5, 1954 5 Sheets-Sheet 4

INVENTOR:
George H. Towner

By Herbert E. Metcalf
His Patent Attorney

Dec. 18, 1956 G. H. TOWNER 2,774,957

ANALOGUE TO DIGITAL FUNCTION CONVERTER

Filed March 5, 1954 5 Sheets-Sheet 5

INVENTOR:
George H. Towner
By Herbert E. Metcalf
His Patent Attorney

United States Patent Office 2,774,957

Patented Dec. 18, 1956

2,774,957

ANALOGUE TO DIGITAL FUNCTION CONVERTER

George H. Towner, San Diego, Calif., assignor to Northrop Aircraft, Inc., Hawthorne, Calif., a corporation of California Application March 5, 1954, Serial No. 414,309

17 Claims. (Cl. 340—205)

This invention relates generally to means for converting analogue information into digital and, more particularly, to an analogue to digital function converter which converts angular rotation of a shaft, for example, into electrical digital signals.

Analogue data can be that which is indicated by a pointer on a meter, for example, the angular deflection of the pointer being proportional to the instantaneous magnitude of an input function. In order to record this information, the angular variations (travel) of the pointer can be converted into digital impulses which are generated as the pointer moves a unit division on the meter dial. A positively increasing function can be represented by a series of positive impulses, and by a series of negative impulses when the function is decreasing. If two output lines are provided, however, then positive impulses can be carried on both lines, the impulses on one line representing input function increases and the other, decreases (in a positive sense). These impulses can be employed to drive an electronic add-subtract counter or be recorded on an oscillograph. In the latter instance, the oscillograph recording tape is driven at a constant speed and the impulses are recorded thereon whenever an impulse is produced. Thus, a permanent record is obtained relating input function variations on a time basis. In the former case, a time base is not recorded; however, the electronic counter would indicate the instantaneous numerical value of the input function and can be used as a remote indicator.

It is an object of this invention to provide means for converting mechanical analogue information into electrical digital signals.

It is another object of the invention to provide an analogue to digital function converter having a positive impulse output on two respective output lines representing positive and negative function changes.

Another object of this invention is to provide an analogue to digital function converter having a positive and negative impulse output on a single output line to represent positive and negative function changes, respectively.

A further object of the invention is to provide suitable commutating (switching) means for use in a function converter.

The foregoing objects are accomplished, in short, by providing a rotary switch, for example, having a biased wiper adapted to be driven in accordance with an analogue-reproduced function, the wiper contacting switch terminals successively. These switch terminals are connected to control two flip-flop circuits, one circuit providing waveforms which are shaped into impulses and the other providing voltage waveforms suitable for control of diode gates which can permit or restrict passage of the impulses into an output circuit. Different flip-flop circuit triggering (switching) means are also provided.

The invention possesses other objects and features, some of which together with the foregoing, will be set forth in the following description of a preferred embodiment of the invention, and the invention will be more fully understood by reference to the accompanying drawings, in which.

Figure 1:
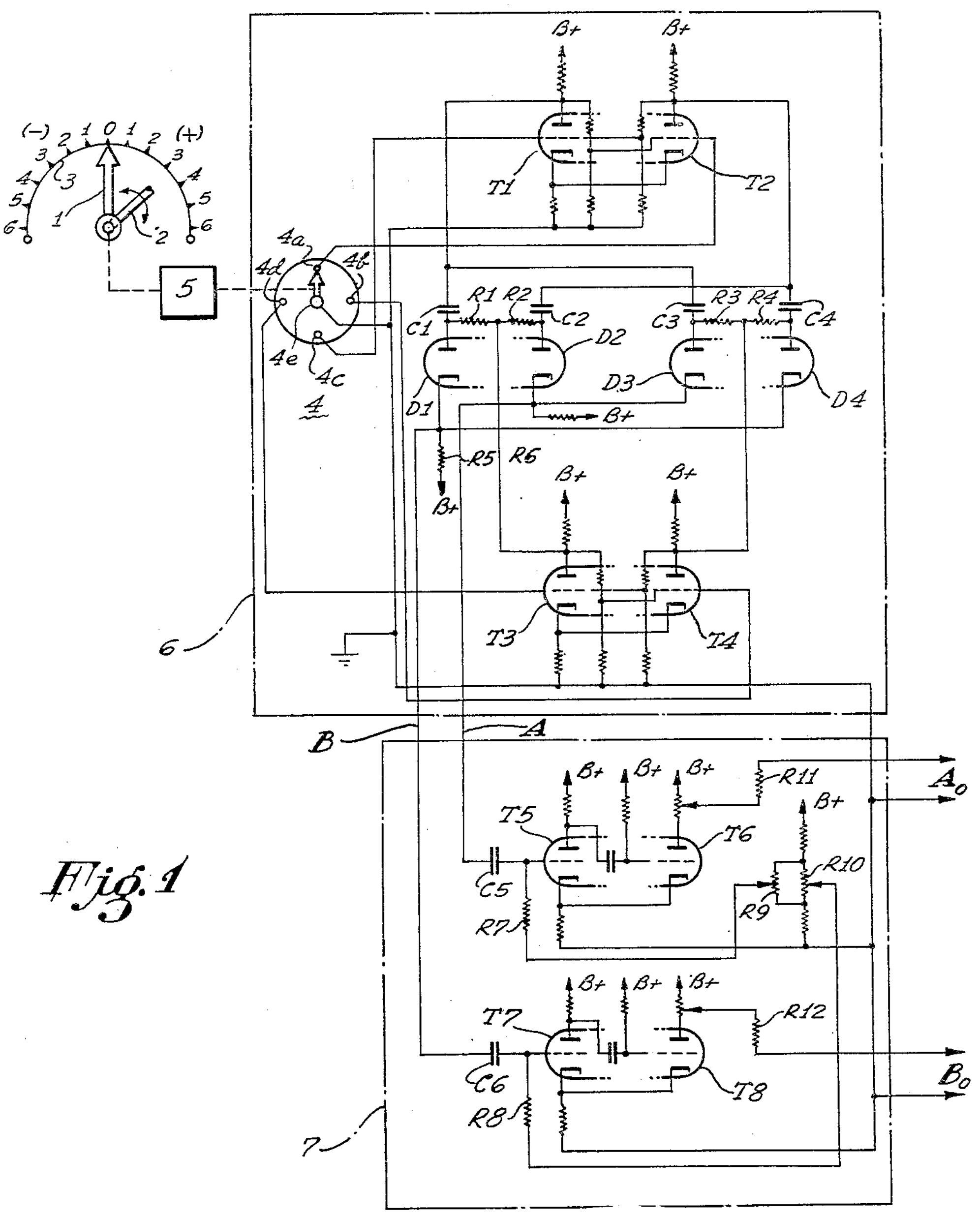
Figure 1 is a circuit diagram of a preferred embodiment of the present invention having two output lines carrying positive impulses representing positive and negative function changes, respectively.

Referring first to Figure 1, there is shown a preferred embodiment of the present invention. A pointer 1 is attached to a drive shaft 2 which rotates according to an input function. Pointer 1 indicates against a dial 3 which can be marked off in positive and negative increments from a central null (zero) position, as shown. The divisions are arbitrary and can be made to be equal. Shaft 2 (and pointer 1) is mechanically coupled to a wiper *4e* by suitable gearing 5 such that wiper *4e* makes one complete revolution for every two divisions movement of pointer 1. The wiper *4e* is coupled to rotate in the same direction as pointer 1 and is part of a four terminal rotary switch 4 having equally spaced terminals *4a*, *4b*, *4c* and *4d*. The unit divisions on dial 3 should be numerous enough such that the input function as applied to shaft 2 is accurately represented; that is, a division on dial 3 should be a relatively small increment of the input function variations. As shown in Figure 1, clockwise rotation of pointer 1 from null position preferably represents positive portions of the input function and counter-clockwise rotation from null represents negative portions thereof. Counter-clockwise rotation of pointer 1 in the positive section of dial 3 would, of course, indicate that the input function is decreasing in magnitude and clockwise rotation of pointer 1 in the negative section on dial 3 indicates that the function is increasing positively (or decreasing negatively).

The invention as illustrated in Figure 1 comprises two distinct parts, a converter section 6 and a wide pulse former section 7. In the converter section 6, triode sections T1 and T2 of a dual triode are connected in a form of multivibrator known as the Eccles-Jordan trigger circuit, often referred to as a flip-flop circuit. Triode T3 and T4 are also connected as a flip-flop circuit. Terminal *4a* of rotary switch 4 is connected to the grid of T2, terminal 4b is connected to the grid of T4, terminal *4c* is connected to the grid of T1 and terminal *4d* is connected to the grid of T3. There are two dual diodes of which D1 and D2 are halves of one dual diode, and D3 and D4 are halves of the other. The plate of T1 is connected to the plates of D1 and D3 through respective capacitances C1 and C3. Similarly, the plate of T2 is connected to the plates of diodes D2 and D4 through respective capacitances C2 and C4. The plate of T3 is connected to the plates of D1 and D2 through respective resistances R1 and R2, and the plate of T4 is connected to the plates of D3 and D4 through respective resistances R3 and R4. The wiper *4e* is connected to ground as are the grid return resistances and cathode resistances of the two flip-flop circuits. The cathodes of diodes D1 and D4 are connected together through resistance R5 to B+ and the cathodes of D2 and D3 connected together through resistance R6 to B+. Output line A is connected to the cathodes of D2 and D3 while output line B is connected to the cathodes of D1 and D4.

Output line A is coupled to the grid of triode section T5 through a capacitance C5. Triode sections T5 and T6 are connected to form a cathode coupled delay multivibrator, often referred to as a one-shot multivibrator, in which the grids are returned to a positive potential rather than ground. Output line B is coupled to the grid of triode section T7 through capacitance C6. Triode sections T7 and T8 are connected to form another one-shot multivibrator with grids returned to a positive potential. The grids of T5 and T7 are returned through resistances R7 and R8 respectively to taps of resistances R9 and R10 of a voltage divider network as shown. Thus, a wide pulse output $A_0$ is secured through resistance R11 connecting with a tap on the plate load resistance of T6 and another wide pulse output $B_0$ is secured through resistance R12 connecting with a tap on the plate load resistance of T8. In this way, the spikes on output lines A and B are converted into wide pulses of sufficient width to drive, for example, a recording device such as an oscillograph (not shown).

Operation of the device illustrated in Figure 1 can be described with reference to Figure 2 which is actually composite drawing of several graphs. Beginning with the first graph at the top, pointer dial reading is plotted as a function of wiper *4e* rotation from null (zero) position. Curve 8 depicts the relation of wiper *4e* rotation for pointer 1 rotation from a zero reading through a +6 reading and thence back to zero. The corresponding wiper *4e* rotation is labeled along the upper side of the abscissa commencing with *a, b, c, d,* etc. through three and a half cycles ending on a "*b*" position at the peak of curve 8. These positions are directly related to the terminals *4a, 4b, 4c,* and *4d,* the numeral 4 being omitted from the graph. The rotation of pointer 1 is reversed at this peak point and wiper *4e* makes three and a half cycles in the sequence *b, a, d, c.* Rotation of pointer 1 from zero through a −6 reading and thence back to zero would generate a curve 9 which depicts the relation between pointer 1 dial reading and wiper *4e* rotation. The lower row of letters *a, d, c, b,* etc. identify corresponding abscissa points for curve 9. Attention can be confined to the first example wherein all positive dial readings were traversed to yield curve 8, since circuit operation will be adequately described for this sequence and circuit operation relating to curve 9 is similar.

The second graph below the first (top) one is labeled Output A and indicates the impulses which should be emitted from line A as point 1 rotates in a clockwise direction from zero. For each pointer dial reading, an impulse is produced and a total of six impulses should appear as shown in the second graph, for this example. Each impulse represents a positive discrete increment of pointer 1 rotation. After pointer 1 reaches the peak of curve 8, pointer 1 rotation is reversed and pointer dial reading begins to decrease progressively. The third graph below the first one is labeled Output B and indicates the impulses which should be emitted from line B as pointer 1 rotates in a counter-clockwise direction, in this instance, following the peak of curve 8. Thus, impulses on line A represent positive (increasing) increments of pointer 1 rotation in a clockwise direction and impulses on line B represent negative (decreasing) increments of pointer rotation in a counter-clockwise direction. If an impulse is to be produced whenever pointer 1 passes an established dial reading, an extra impulse 10 will be generated since pointer 1 passes the +6 dial reading once on going up and again on coming down (curve 8), in which case the algebraic sum of lines A and B for the complete cycle will total −1 instead of zero as it should, in order that pointer 1 indication and net impulse output is to coincide. This invention generates the correct impulse output on each line such that an extra pulse 10, for example, is not produced on reversal of pointer 1 rotation.

When pointer 1 is indicating null (zero), the wiper *4e* is adjusted to make contact with terminal *4a.* This is abscissa value "*a*" for the corresponding zero pointer dial reading for curve 8. Since wiper *4e* is connected to ground (B−), the initial condition of the plate of T2 will be at a high (B+) potential and, therefore, the plate of T1 is correspondingly low because T1 will be "on" and conducting heavily. The fourth graph labeled Plate T2 is a plot of the plate potential of T2 and the sixth graph from top in Figure 2 labeled Plate T1 is a plot of the behavior of the plate potential of T1 over the range of pointer 1 rotation from 0 pass +6 and back to 0 again. Halfway between 0 and +1, wiper *4e* is rotated by gearing 5 to contact terminal *4b.* This corresponds to the first "*b*" point following the zero point on the abscissa of the first graph for curve 8. In this position, the grid of T4 is connected to ground, hence the plate potential thereof rises and places, through R3 and R4, the plates of diodes D3 and D4 at B+ potential, capable of passing positive impulses through these diodes. At the same time, the plate potential of T3 drops to a low potential which is applied to the plates of diodes D1 and D2 through respective resistances R1 and R2. Since the cathodes of all four diode sections are biased to B+ potential because the load resistances R5 and R6 are returned to B+, diodes D1 and D2 are not conductive to any impulses in this condition. When pointer 1 reaches +1, wiper *4e* contacts terminal *4c* which is connected to the grid of T1. This action turns "off" T1 and turns "on" T2 such that the plate potential of T1 rises to a high potential and that of T2 drops to a low potential. These plate voltage changes pass through respective RC differentiating networks and appear at the diode plates as short time duration spikes. The eighth and ninth graphs from the top of Figure 2 are labeled Plates D1 and D2 and Plates D3 and D4, respectively, the curves thereof showing the variation of plate potential of the four diodes over the range of curve 8. A diode will pass a positive impulse only when its plate is at a high gating potential. This gating potential is essentially at B+ for all practical purposes and does not exceed this.

Continued rotation of wiper *4e* to contact terminal *4d* turns "off" T3 and turns "on" T4. This action places a high potential on the plates of diodes D1 and D2 and puts the plates of D3 and D4 at a low potential. This occurs at position "*d*" on the abscissa of the first graph, at the end of the first cycle. The next contact made by wiper *4e* is with terminal *4a,* which begins the second cycle (position "*a*"). This contact causes T2 to be turned "off" and T1 turned "on." These events take place at times designated by wiper *4e* positions as shown in the graphs of Figure 2. The plate potentials of T1 and T2 are changed in regular sequence until wiper *4e* reverses direction of rotation at the peak of curve 8. In the first graph, a position point "*a*" precedes and follows the position point "*b*" corresponding to the peak point of curve 8. Thus, the conditions of T1 and T2 are not affected until wiper *4e* makes contact with terminal *4c* (first "*c*" position following the peak point "*b*") after which the plate potential changes of T1 and T2 are again regular.

The changes of plate potential of T2 are differentiated and applied through C2 and C4 respectively to the plates of D2 and D4. Similarly, those changes in plate potential of T1 are also differentiated and applied through C1 and C3 respectively to the plates of D1 and D3. The fifth graph labeled *d*(T2) to D2 & D4 shows the differentiated results of the fourth plot (labeled Plate T2) and consists of a series of positive and negative impulses (transient spikes) occurring at the points of plate potential rises and drops of the fourth graph. Similarly, the seventh graph of Figure 2 from the top is labeled *d*(T1) to D1 & D3 and consists of a series of positive and negative impulses which are differentiated results of the plot of plate potential of T1 (the sixth graph). These impulses are applied to the plates of diodes D1 and D3. Now, by comparing the plot of the fifth graph with that of the eighth graph and comparing the plot of the seventh graph with that of the ninth graph, and remembering that the outputs of diodes D2 and D3 make up the contents of line A while the outputs of diodes D1 and D4 make up the contents of line B, the tenth and eleventh graphs labeled line A and line B, respectively, are obtained. It is noted that positive impulses are passed by the diodes only when the respective diode plates are placed at B+ potential, and the extra impulse 10 (third graph of Figure 2) does not appear in the last graph of Figure 2, thus providing a correct pulse output.

The impulses on line A and line B are supplied to the one shot multivibrators T5, T6 and T7, T8 respectively, to produce wide pulses, for example, 1/60 second in width which can be employed to drive various apparatus.

Figure 3:
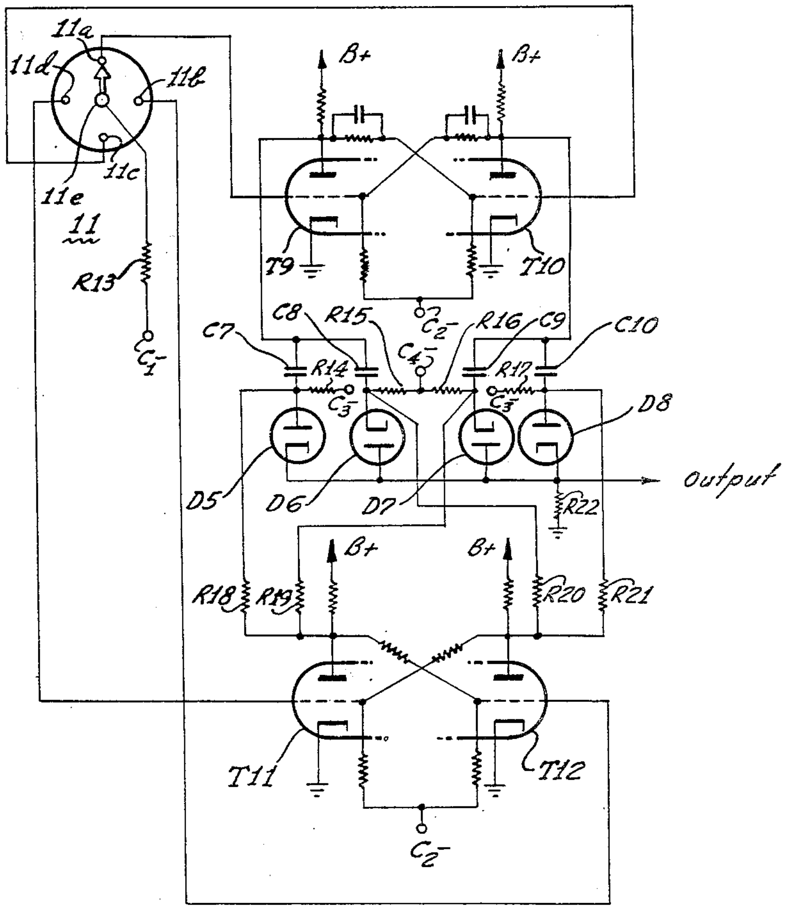
Figure 3 is a circuit diagram of the invention showing a single output line embodiment, the output thereof consisting of positive and negative impulses to represent positive and negative function changes respectively.

Referring now to Figure 3, a circuit wherein a single output line carrying both positive and negative impulses to represent clockwise and counter-clockwise pointer rotation, respectively, is shown without including either the pointer and dial or the mechanical connecting means to drive wiper **11*e* of a four position rotary switch 11. The switch 11 is identical to switch 4 of Figure 1 having four equally spaced terminals 11*a*, 11*b*, 11*c* and 11*d*. The wiper 11*e*, however, is connected to a negative bias voltage $C_1$— through a resistance R13 as shown. Triode sections T9 and T10 of a dual triode are connected as a flip-flop circuit. Similarly, triode sections T11 and T12 of another dual triode are also connected as another flip-flop circuit. Terminal 11*a* is directly connected to the grid of T9, terminal 11*b* is connected to the grid of T12, terminal 11*c* to the grid of T10 and terminal 11*d*** to the grid of T11. The plate of T9 is connected to the plate of a diode D5 through capacitance C7 and to the cathode of diode D6 through capacitance C8. Similarly, the plate of T10 is connected to the plate of a diode D8 through a capacitance C10 and also to the cathode of diode D7 through capacitance C9. All the other electrodes of the four diodes are connected together to one end of a resistance R22, the other end of which is connected to ground, and an output is derived across this resistance R22 as indicated.

It is to be noted that the grids of the two flip-flop circuits are biased through resistances to a negative bias voltage $C_2$—. The plates of diodes D5 and D8 are also biased by a negative bias voltage $C_3$— through respective resistances R14 and R17. Similarly, the cathodes of diodes D6 and D7 are biased to another negative bias voltage $C_4$— through respective resistances R15 and R16. As shown in Figure 3, the plate of T11 is connected to the plate of diode D5 and to the cathode of diode D7 through respective resistances R18 and R19. Similarly, the plate of T12 is connected to the plate of diode D8 and to the cathode of diode D6 through respective resistances R21 and R20. The values of the circuit elements and the bias voltages are chosen such that the plate potentials of T11 and T12 as provided to the four diodes will permit passage or block passage, as the case may be, of both positive and negative impulses applied to these diodes. The impulses are produced by differentiating the plate potential changes of T9 and T10 by use of suitable capacitance (C7, C8, C9, C10) values selected in conjunction, as usual, with the associated resistances of each RC circuit.

Figure 2:
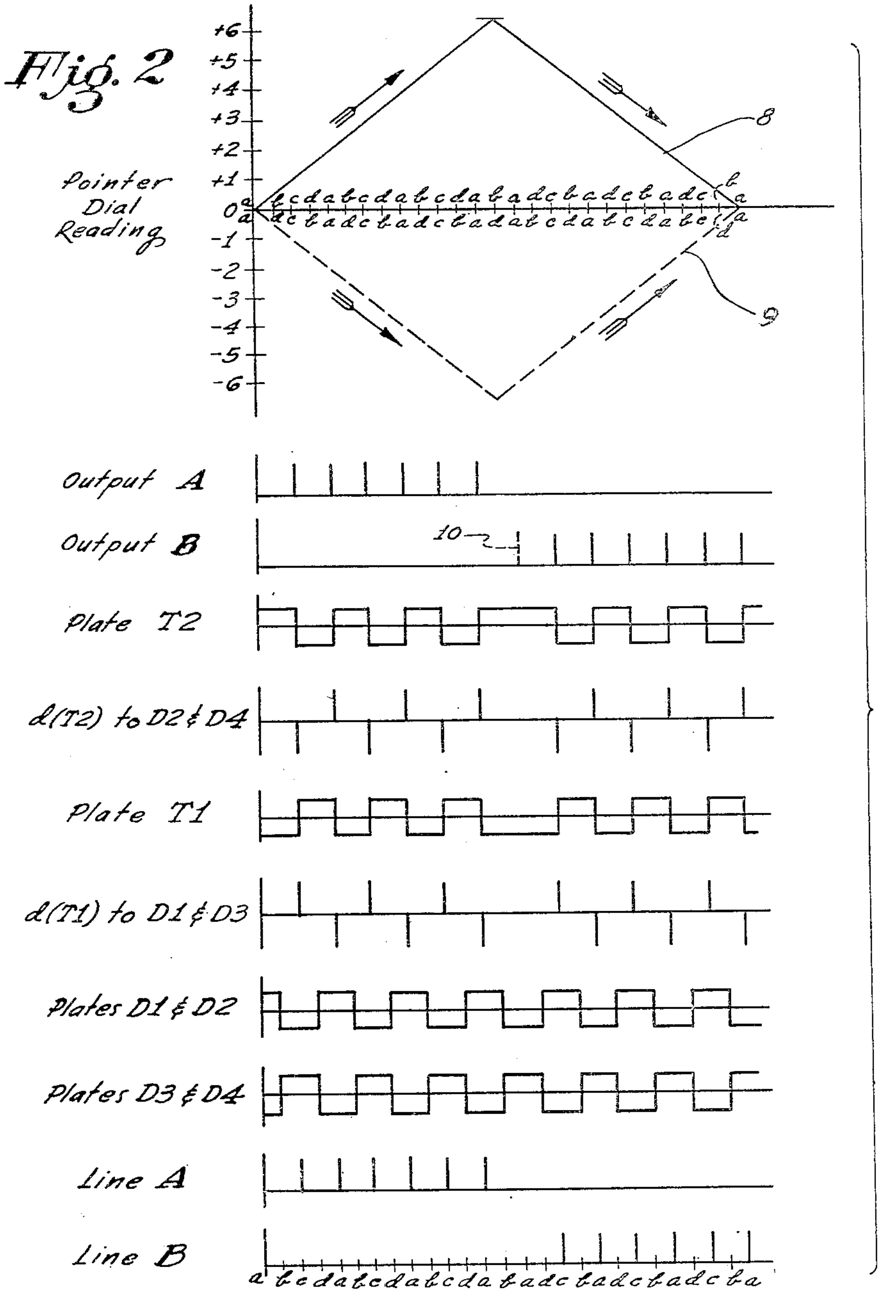
Figure 2 is a group of graphs plotted to the same abscissa scale to illustrate operation of the circuit of Figure 1.
Figure 4:
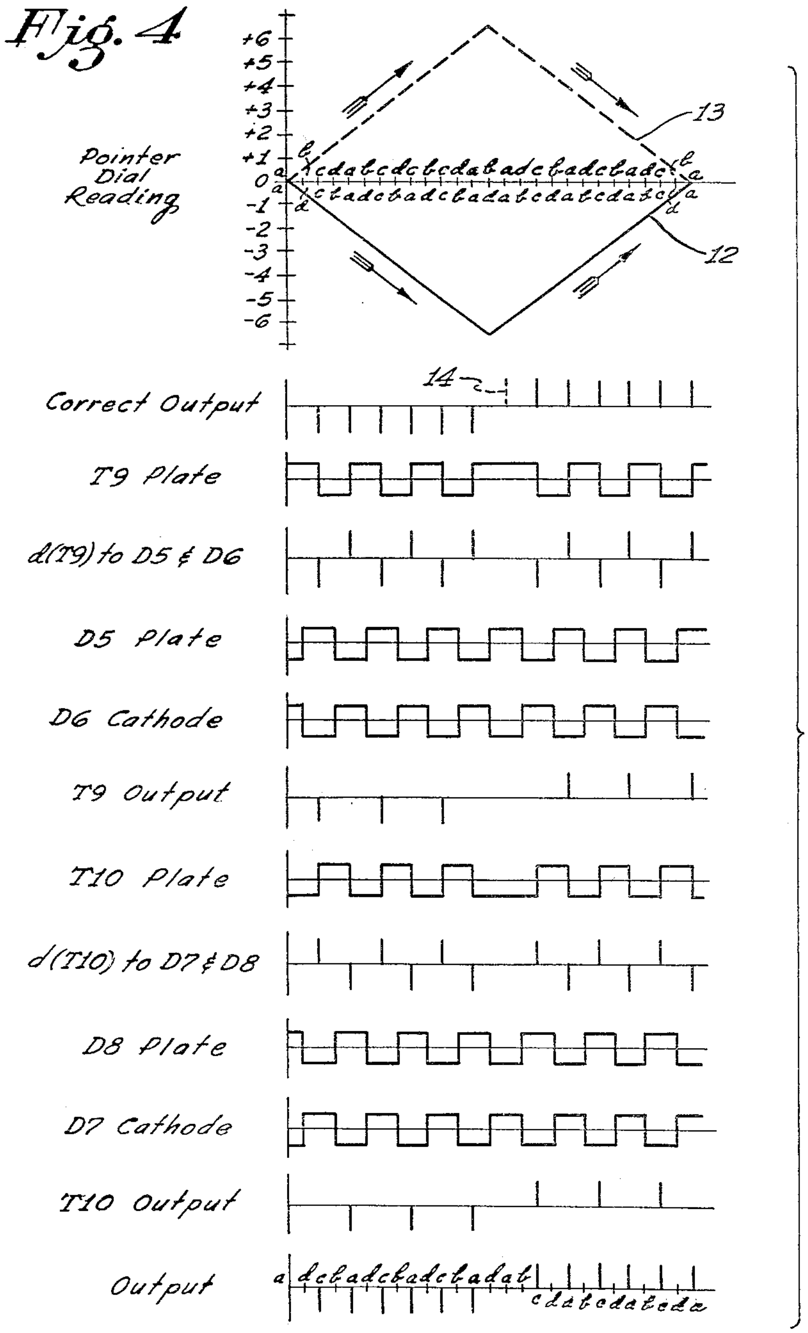
Figure 4 is another composite graph showing several graphs plotted to the same abscissa scale to illustrate operation of the circuit of Figure 3.

In Figure 4, which is another composite drawing including several graphs based on the same abscissa scale, the first (top) graph is essentially identical to the first (top) graph of Figure 2, curves 12 and 13 corresponding to curves 9 and 8, respectively. Here, in Figure 4, pointer dial reading is related to wiper **11*e* rotation by curves 12 and 13**, the abscissa of the first graph being labeled along the abscissa with the letters *a*, *b*, *c* and *d* which identifies the corresponding terminals **11*a*, 11*b*, 11*c* or 11*d* that wiper 11*e* is contacting at the different pointer dial reading. The upper row of letters along the abscissa of the first graph is associated with curve 13 and the lower row associated with curve 12. The remaining graphs pertain only to curve 12 which is a plot of counter-clockwise pointer rotation from zero to a peak reading and back to zero. In Figure 3, wiper 11*e* is thus driven in a counter-clockwise direction and then in a clockwise direction, the wiper 11*e* being rotated half of a complete revolution for each unit division change of the pointer to which wiper 11*e*** is coupled.

The second graph from the top of Figure 4 is labeled Correct Output and illustrates the desired impulse output that should be generated for the example of pointer movement indicated for curve 12. As curve 12 increases negatively from zero, a series of negative impulses is produced for each unit division of dial reading. At the peak of curve 12, the rotation of wiper **11*e* is reversed and a series of positive impulses is generated as curve 12 increases positively (decreases negatively) to back to zero reading. Since an impulse is normally desired at every unit point of pointer dial reading, an extra impulse 14 would be produced in this event and, for the example shown, there would be a total of seven positive impulses generated to counteract the previous six negative impulses for the complete cycle of operation. The invention embodiment illustrated in Figure 3 does not produce such an extra impulse as 14** as will be made clear in the ensuing discussion of circuit operation, as exemplified by the graphs of Figure 4.

The third graph is labeled T9 Plate and is plot of plate potential variation of T9. When wiper **11*e* contacts terminal 11*a* at the start of curve 12, the plate potential of T9 is high and that of T10 is low. Thus, the eighth graph of Figure 4 labeled T10 Plate shows a plot of plate potential of T10 which is opposite at the start and all times to that of the third graph. From these two graphs, it is noted that plate potential is not changed at impulse 14 position. This is because wiper 11*e* reversed direction of rotation at the peak of curve 12 at terminal 11*d*, returning to contact terminal 11*a* which does not have any effect on T9 or T10 since T9 is already "off" and T10 is "on." Rotation of wiper 11*e* contacting terminals 11*d* and 11*b*** causes periodic switching of T11 and T12 "off" and "on." Since the plate of T11 is connected through resistances R18 and R19 to the plate of diode D5 and the cathode of diode D7, respectively, and the plate of T12 is connected through resistances R20 and R21 to the plate of diode D8 and the cathode of diode D6, respectively, these diodes are placed periodically in suitable condition for passage of impulses applied thereto. Diodes D5 and D8 will pass positive impulses only when the plates thereof are made higher in potential (raised to ground potential) and diodes D6 and D7 will pass negative impulses only when the cathodes thereof are biased to a lower (ground) potential. These diodes, of course, are varied in accordance with the conditions of the plates of T11 and T12 to which they are connected. The fifth and sixth graphs labeled D5 Plate and D6 Cathode, respectively, are plots which show the variations of plate potential of diode D5 and cathode potential of diode D6. Similarly, the tenth and eleventh graphs labeled D8 Plate and D7 Cathode, respectively, are plots which show the variation of plate potential of diode D8 and cathode potential of diode D7.

Changes in plate potential of T9 and T10 are coupled to the diodes D5, D6, D7 and D8 through differentiating capacitances C7, C8, C9 and C10. Positive and negative impulses are provided from T9 to diodes D5 and D6 as shown in the fourth graph labeled $d$(T9) to D5 & D6. Similarly, impulses are provided from T10 to diodes D7 and D8 as shown in the ninth graph labeled $d$(T10) to D7 & D8. By comparing the plot of the fourth graph with that of the fifth and sixth, and comparing the plot of the ninth graph with that of the tenth and eleventh, the respective plots of the seventh and twelfth graphs labeled T9 Output and T10 Output are readily derived. The thirteenth graph labeled Output is the result of combining the T9 output and T10 output plots. As shown, the last graph of Figure 4 consists of a series of negative and positive impulses which are produced when wiper 11*e* contacts terminals 11*a* and 11*c* each time except at the beginning of curve 12 and at the peak point thereof.

The foregoing description is valid for more limited rotation of the pointer 1, however, in this case gearing 5 should be shifted (changed) such that wiper 4*e* (or 11*e*) is rotated a greater amount for a unit division of dial 3.

An obvious alternative is to employ an integral multiple of the present switch terminals and connecting corresponding ones in parallel such that several complete cycles of circuit operation are accomplished for a single revolution of switch wiper. This is, of course, desirable if the same accuracy is to be maintained. The accuracy of digital reproduction can obviously be increased by increasing the gear ratio between pointer 1 and wiper 4*e* over a given range of pointer variation.

Figures 5, 6, 7:
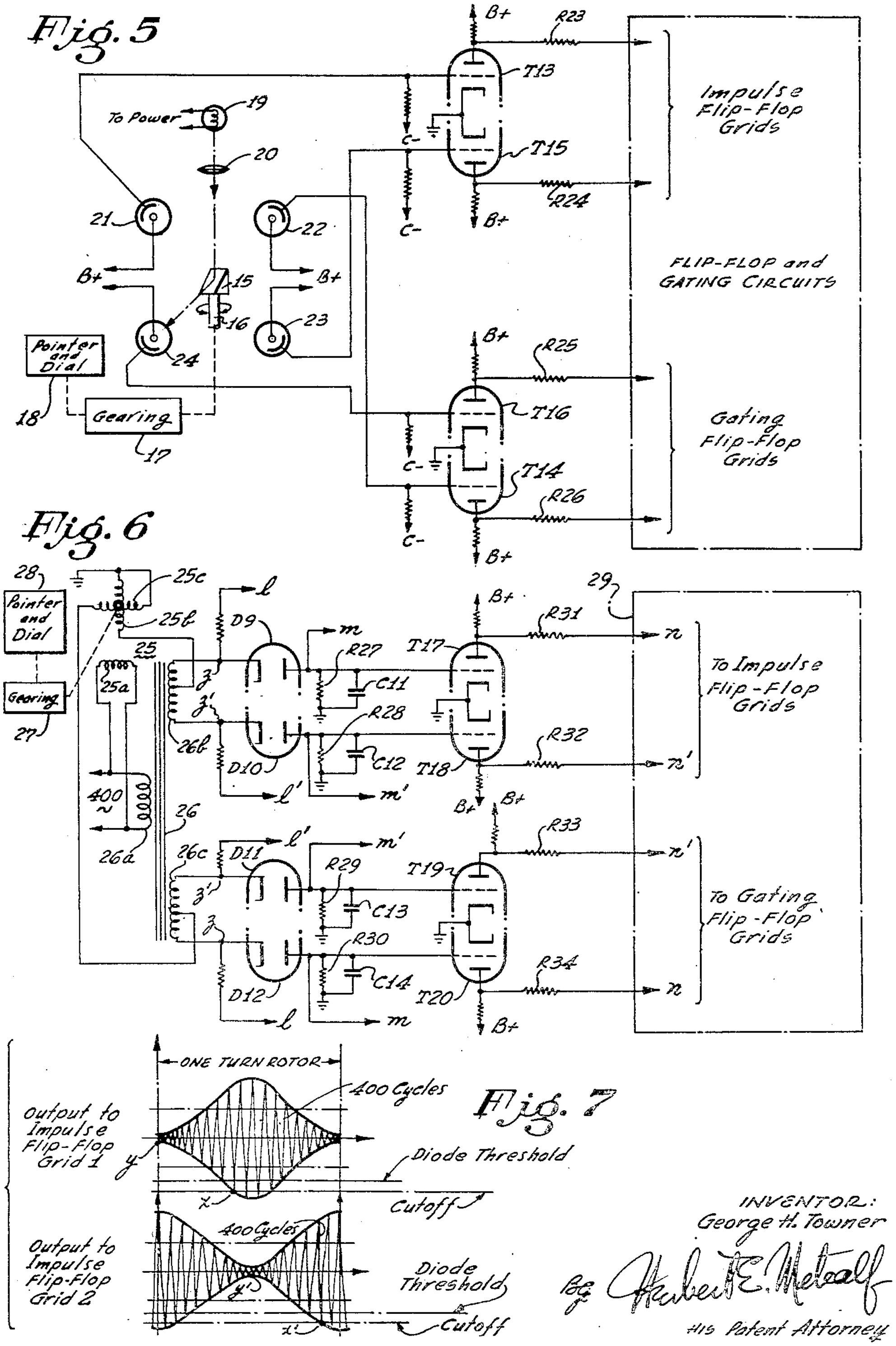
Figure 5 is a circuit diagram showing a converter system wherein photoelectric means are employed to accomplish flip-flop circuit triggering.
Figure 6 is a circuit diagram illustrating flip-flop triggering means which includes a resolver, transformer, diodes and amplifier means.
Figure 7 is a composite graph which illustrates operation of the circuit of Figure 6. Two plots are shown relating resolver rotor revolution and transformer output to flip-flop control grids.

In Figure 5, there is shown an alternate way for causing suitable triggering of the flip-flop circuits. A right angle aluminized prism 15 (or 45° mirror) is attached to the end of a shaft 16 which is rotated through gearing 17 according to motion of a pointer in a pointer and dial assembly 18. The light from a lamp 19 is focused by a lens system 20 on prism 15 such that light is reflected off the hypotenuse face successively onto each phototube 21, 22, 23 and 24 as the prism 15 is rotated on shaft 16. The anodes of the phototubes are connected to B+ potential (or some other positive value as desired). The cathodes of these phototubes are respectively connected to a grid of an amplifier tube, the grids of which can be returned through a resistance to a C− bias voltage. As shown, the cathode of phototube 21 is connected to the grid of T13, that of phototube 22 connected to the grid of T14, that of phototube 23 connected to T15 and that of phototube 24 connected to the grid fo T16. Isolating resistances R23 and R24 couple the plate outputs of T13 and T15, respectively, to the control grids of the impulse forming flip-flop circuit (as shown in Figure 1 or 3) and resistances R25 and R26 couple the plate outputs of T16 and T14, respectively, to the control grids of the gating control flip-flop circuit.

The operation of this circuit is quite direct; when a phototube is irradiated by light reflected from prism 15, the grid of an amplifier tube is raised in potential and conducts current such that a drop in plate potential occurs. This drop, of course, is applied to one of the control grids of a flip-flop circuit for control thereof. Other than the manner of producing triggering action on the flip-flop circuits, the operation of such a function converter is identical to those previously described in Figures 1 and 3. The advantage of this system is that an extremely low inertia, high reliability switching device is presented.

Another low inertia switching (triggering) system is shown in Figure 6. There are actually three different systems included in the circuit diagram of Figure 6. The first system includes a resolver 25 having a stator coil 25*a* and two rotor coils 25*b* and 25*c* wound at right angles to each other. A transformer 26 having a primary winding 26*a* and two center-tapped secondary windings 26*b* and 26*c* is also required.

It may be noted that the rotor can carry the reference signal winding and the stator the right angle coils. The resolver can also be directly replaced by a microsyn, a device having all the coils wound on the stator and in which the rotor is a salient, laminated soft iron rotor. Two windings which are separated by 90 degrees on the stator can be connected as are the resolver rotor windings shown in Figure 6. The advantage here is that use of the microsyn eliminates the slip rings necessary with the resolver. Windings 25*a* and 26*a* are excited by a 400 cycle reference signal. For high rates of resolver rotor rotation, a 3000 cycle signal or higher may be desirable. The rotor of the resolver 25 is driven through gearing 27 which, in turn, is driven off a drive shaft (not shown) that is used to rotate the pointer of a pointer and dial assembly 28. One end of each winding 25*b* and 25*c* is connected to ground and the other ends are connected respectively to the center-tap of transformer secondaries 26*b* and 26*c*. Outputs $l$ and $l'$ secured through isolating resistances connected to each end of the secondary windings 26*b* and 26*c* can be used to control respective impulse flip-flop circuits and gating flip-flop circuits by connecting these output leads to the different flip-flop grids in a block 29, which can include (without the rotary switch, of course) the flip-flop and gating circuits only of either Figure 1 or Figure 3. The remainder of the circuit including diodes and amplifier sections shown in Figure 6 are omittted. For this converter configuration, the resolver rotor is generally set to rotate several turns for each unit division pointer travel in assembly 28. Thus, gearing 27 must be set at a higher gear ratio than before. In addition, the bias on the flip-flop grids should be adjusted to avoid positive cycle triggering.

Referring to Figure 7, two graphs are shown which are plotted as having the same time abscissa scale. The upper graph shows a plot of output voltage provided to an impulse flip-flop grid in 29 and the lower graph shows a plot of the output voltage provided to the other impulse flip-flop grid. Figure 7 depicts a condition wherein rotor motion occurs; the 400 cycle signal is not modulated when the rotor is stationary and will appear as a constant amplitude wave having peak levels depending on the particular mechanical angle of the rotor. The voltage at points $z$ and $z'$, respectively, is the vector sum of that across a rotor coil and that of one half of a secondary winding connected in series with the rotor coil. When a point $z$, for example, is at a maximum A.-C. amplitude point, point $z'$ at the other end of the same secondary winding is at a minimum or zero amplitude point $y$ or $y'$ due to the resolver and transformer connections. A flip-flop circuit connected to leads $l$ and $l'$, in which the tube having its control grid connected to lead $l$ is on, will be instantaneously cut off at point $x$ thus switching the flip-flop. This circuit will remain switched until the other grid connected to lead $l'$ is placed at cutoff after the rotor rotates through 180°. At inbetween rotor positions when the 400 cycle voltage is on both grids, the grid to cathode resistance of the on tube is low and shorts out the 400 cycle voltage on the grid thereof. The off tube grid is negative enough (grid bias properly adjusted by varying cathode resistance, for example) so that this tube remains cut off, even at the positive peaks of the modulated 400 cycle voltage. Consequently, since circuit connections are symmetrical, the graphs of Figure 7 also apply to the output voltage as provided to the gating control flip-flop grids, except that there is a 90° phase difference between the impulse flip-flop and the gating control flip-flop curves. A flip-flop can be triggered at point $x$ (or $x'$). This trigger point is located at the intersection of the envelope of the modulated 400 cycle reference signal with the cutoff level and may vary a little in exact position for each turn of the rotor.

For the second switching system, diodes D9, D10, D11 and D12 can be connected in series with the transformer secondaries. The cathodes of these diodes are connected to an end of a transformer secondary winding and the plates thereof to the flip-flop control grids, as indicated by leads $m$ and $m'$ in Figure 6. In this case, diode load resistances will be those in the flip-flop circuits. In Figure 7, diode threshold level is indicated in both graphs and it is evident that the positive cycle alternations of the 400 cycle signal are eliminated such that only the lower envelope need be considered. Triggering still takes place at $x$ and $x'$ near the peak of the envelopes, however, this point is not sharply defined by the 400 cycle signal peaks.

In the final triggering system, diode load resistances R27, R28, R29 and R30 having filter capacitances C11, C12, C13 and C14 respectively are connected to the plates of the diodes and the filtered outputs thereof are connected to the control grids of T17, T18, T19 and T20 as shown. The plate outputs of these amplifiers are connected through isolating resistances R31, R32, R33 and R34 to the different flip-flop control grids by leads $n$ and $n'$. The tubes T17, T18, T19 and T20 are normally cut off by the rectified and filtered A.-C. voltage and the plates thereof are at B+ potential; however, at the minimum point $y$ (and $y'$) the tubes conduct, resulting in a drop of plate potential which is applied to the flip-flop control grids to cut off a tube. The addition of the amplifiers makes available the use of the sharply defined point $y$ (and $y'$) for flip-flop control. With a sharper firing point, and the additional amplifier section, critical adjustments are not necessary to insure satisfactory operation of the converter in this third embodiment of switching means.

Different versions of a preferred embodiment of the present invention and components thereof have been described, however, it should be understood that the invention is not limited to the specific features shown, but that the means and construction herein disclosed comprise the preferred form of several modes of putting the invention into effect and the invention is, therefore, claimed in any of its forms or modifications within the legitimate and valid scope of the appended claims.

What is claimed is:

1. An analogue to digital function converter, comprising: an impulse flip-flop circuit having two inputs and two outputs; a gating control flip-flop circuit having two inputs and two outputs; impulse gating means, the outputs of said gating control flip-flop circuit connected thereto for control thereof; differentiating means for producing impulses from the outputs of said impulse flip-flop circuit connecting the impulse flip-flop outputs to the input of said gating means; and means connecting said flip-flop inputs for triggering said impulse and said gating control flip-flop circuits alternately in one sequence for an increasing analogue-represented function and in reversed sequence for a decreasing analogue-represented function, whereby impulses are provided to said gating means and passed therethrough according to the outputs of said gating control flip-flop circuit controlling said gating means.

2. An analogue to digital function converter, comprising: an impulse flip-flop circuit having two inputs and two outputs; a gating control flip-flop circuit having two inputs and two outputs; first and second impulse gating means, the outputs of said gating control flip-flop circuit connected thereto for control thereof; differentiating means for producing impulses from the impulse flip-flop outputs connecting the outputs of said impulse flip-flop circuits to the inputs of said gating means; and means connected to said flip-flop inputs for triggering said impulse and said gating control flip-flop circuits alternately in one sequence for an increasing analogue-represented function and in reversed sequence for a decreasing analogue-represented function, whereby impulses are provided to said first gating means and passed therethrough for one flip-flop trigger sequence only, and to said second gating means and passed therethrough for the other flip-flop trigger sequence only.

3. An analogue to digital function converter, comprising: a rotary switch having at least four equally spaced terminals successively contacted by a wiper, said wiper adapted to be driven in a clockwise direction for a positively increasing analogue-reproduced function and in a counter-clockwise direction for a negatively increasing function; a voltage source having a positive and a negative terminal; means connecting said wiper to said negative terminal of said source; a first flip-flop circuit having first and second tube sections each including a plate, cathode and a control grid; a second flip-flop circuit having a first and second tube section each including a plate, cathode and a control grid; means connecting said first and second flip-flop circuits to said voltage source for a plate supply voltage; means connecting diametrically opposite switch terminals respectively to the control grids of each said flip-flop circuits; a first, second, third and fourth diode gate each having a plate and a cathode; means connecting said cathodes of said diode gates to said positive terminal of said voltage source for a positive bias; differentiating circuit means for producing impulses connecting said first tube section plate of said first flip-flop circuit to the plates of said first and third diode gates and the other plate of said first flip-flop circuit to the plates of said second and fourth diode gates; means connecting said first tube section plate of said second flip-flop circuit to the plates of said first and second diode gates and the other plate of said second flip-flop circuit to the plates of said third and fourth diode gates, said diode gates biased to pass impulses when raised to a high potential only; means connecting with the cathodes of said second and third diode gates for a first output; and means connecting with the cathodes of said first and fourth diode gates for a second output.

4. Apparatus in accordance with claim 3 including, in addition, first and second means for forming wide pulses from an impulse input, said pulse forming means connected to said first and second output respectively.

5. Apparatus in accordance with claim 3 wherein said four terminals of said rotary switch are connected in clockwise sequence respectively to the grids of the second tube section of said first flip-flop circuit, the second tube section of said second flip-flop circuit, the first tube section of said first flip-flop circuit and the first tube section of said second flip-flop circuit, said first output providing impulses for clockwise rotation of said wiper and said second output providing impulses for counter-clockwise rotation of said wiper.

6. An analogue to digital function converter, comprising: a rotary switch having at least four equally spaced terminals successively contacted by a wiper, said wiper adapted to be driven in a clockwise direction for a positively increasing analogue-reproduced function and in a counter-clockwise direction for a negatively increasing function; a first negative bias voltage; means connecting said wiper to said first negative bias voltage; a first flip-flop circuit having first and second tube sections each including a plate, cathode and a control grid; a second flip-flop circuit having a first and second tube section each including a plate, cathode and a control grid; means connecting diametrically opposite switch terminals respectively to the control grids of each said flip-flop circuits; a first, second, third and fourth diode gate each having a plate and a cathode; means connecting the plates of said first and fourth diode gates to a second negative bias voltage; means connecting the cathodes of said second and third diode gates to a third negative bias voltage; differentiating means for producing impulses connecting said first tube section plate of said first flip-flop circuit to the plate and cathode of said first and second diode gates respectively, and the other plate of said first flip-flop circuit to the cathode and plate of said third and fourth diode gates respectively; means connecting said first tube section plate of said second flip-flop circuit to the plate and cathode of said first and third diode gates respectively, and the other plate of said second flip-flop circuit to the cathode and plate of said second and fourth diode gates respectively, said first and fourth diode gates biased to pass positive impulses when raised to a high potential only and said second and third diode gates biased to pass negative impulses when biased to a low potential only; and means connecting the cathodes of said first and fourth diode gates and the plates of said second and third diode gates together for an output.

7. Apparatus in accordance with claim 6 wherein said four terminals of said rotary switch are connected in a clockwise sequence respectively to the grids of the first tube section of said first flip-flop circuit, the second tube section of said second flip-flop circuit, the second tube section of said first flip-flop circuit and the first tube section of said second flip-flop circuit, said output providing positive impulses for clockwise rotation of said wiper and negative impulses for counter-clockwise rotation of said wiper.

8. Apparatus in accordance with claim 6 wherein said output connecting means includes a resistance connecting said first and fourth diode gate cathodes and said second and third diode gate plates together at one end, the other end of said resistance connected to ground, whereby an output is derived across said resistance.

9. In a function converter of the character described, flip-flop circuit triggering means, comprising: at least four phototubes equidistantly positioned substantially on the periphery of a circle; a source of light; means for focusing the light from said source on the center of said circle; reflecting means located at the center of said circle and positioned to reflect said light onto each said phototubes as said reflecting means is rotated; means for rotating said reflecting means according to an input function; amplifying means connected to the output of each said phototubes; and means for connecting the output of said amplifying means respectively to grids of two flip-flop circuits for control thereof.

10. In a function converter of the character described, flip-flop circuit triggering means, comprising: a resolver having a stator winding and a rotor winding, one of said windings energized by a reference frequency signal; means for rotating said rotor according to an input function; a transformer having a primary and a center-tapped secondary, said primary energized by said reference signal and said center tap connected in series with said rotor winding; means connecting one end of said secondary and said free end of said rotor winding for a first output; and means connecting the other end of said secondary and said free end of said rotor winding for a second output.

11. Apparatus in accordance with claim 10 including, in addition, first diode rectifying means having a cathode and an anode, said cathode connected in series to one end of said secondary and said anode connected in series with said first output means, and second diode rectifying means having a cathode and an anode, said latter cathode connected in series to the other end of said secondary and said latter anode connected in series with said second output means, whereby rectified output signals are provided.

12. Apparatus in accordance with claim 11 wherein said first output means is a first diode load resistance and said second output means is a second diode load resistance, and including, in addition, first amplifying means having an input and an output, said input connected across said first diode load resistance, and second amplifying means having an input and an output, said latter input connected across said second diode load resistance, whereby amplified and phase-reversed first and second outputs are obtained.

13. Apparatus in accordance with claim 12 including, in addition, means for filtering said first and second diode outputs, said latter means including first and second capacitances respectively connected across said first and second diode load resistances.

14. In a function converter of the character described, flip-flop circuit triggering means comprising: a resolver having a stator winding and two rotor windings wound at 90 degrees difference, said stator winding energized by a reference frequency signal; means for rotating said rotor according to an input function; a transformer having a primary and two center-tapped secondaries, said primary energized by said reference signal and said center taps each connected in series with a rotor winding; means connecting an end of each said transformer secondaries and the free end of a respective rotor winding for four separate outputs.

15. Apparatus in accordange with claim 14 including, in addition, rectifying means connected in series between each said ends of said secondaries and the respective connecting output means.

16. Apparatus in accordance with claim 15 wherein said output means is a load resistance connected to each rectifying means, and including, in addition, amplifying means having an input and an output for each rectifying means, each said input connected across one said load resistances, whereby amplified and phase-reversed outputs are obtained.

17. Apparatus in accordance with claim 16 including, in addition, means for filtering said rectifying means outputs, said filter means including a capacitance connected across each said load resistances.

References Cited in the file of this patent

UNITED STATES PATENTS

| | | |
|---|---|---|
| 2,656,106 | Stabler | Oct. 20, 1953 |
| 2,671,892 | Childs | Mar. 9, 1954 |
| 2,685,082 | Beman et al. | July 27, 1954 |